United States Patent
Winter

(10) Patent No.: US 8,140,819 B2
(45) Date of Patent: Mar. 20, 2012

(54) METHOD AND APPARATUS FOR MANAGING MEMORY ACCESSES IN AN AV DECODER

(75) Inventor: Marco Winter, Hannover (DE)

(73) Assignee: Thomson Licensing (FR)

( * ) Notice: Subject to any disclaimer, the term of this patent is extended or adjusted under 35 U.S.C. 154(b) by 901 days.

(21) Appl. No.: 11/448,561

(22) Filed: Jun. 7, 2006

(65) Prior Publication Data

US 2007/0016753 A1    Jan. 18, 2007

(30) Foreign Application Priority Data

Jul. 1, 2005 (DE) .................... 051 06 000

(51) Int. Cl.
*G06F 12/12* (2006.01)
(52) U.S. Cl. ............... 711/202; 711/E12.074
(58) Field of Classification Search .............. None
See application file for complete search history.

(56) References Cited

U.S. PATENT DOCUMENTS

| | | | | |
|---|---|---|---|---|
| 5,463,751 A | * | 10/1995 | Yonezawa et al. | 711/1 |
| 5,687,342 A | * | 11/1997 | Kass | 711/201 |
| 6,385,712 B1 | * | 5/2002 | Campbell | 711/206 |
| 6,813,735 B1 | * | 11/2004 | Kurihara et al. | 714/711 |
| 7,336,682 B2 | * | 2/2008 | Singh | 370/474 |
| 2002/0196718 A1 | * | 12/2002 | Okazaki et al. | 369/47.34 |
| 2005/0226115 A1 | * | 10/2005 | Okazaki et al. | 369/47.34 |

FOREIGN PATENT DOCUMENTS

EP    0 710 029 A2    5/1996

OTHER PUBLICATIONS

Search Report Dated Sep. 15, 2005.
Patent Abstracts of Japan vol. 1998, No. 01, Jan. 30 1998) & JP 09 246986 A (Matsushita Electric Ind. Co. Ltd.), Sep. 19, 1997.

* cited by examiner

*Primary Examiner* — Edward Dudek, Jr.
*Assistant Examiner* — Ryan Dare
(74) *Attorney, Agent, or Firm* — Jack Schwartz & Associates, PLLC

(57) ABSTRACT

The invention describes apparatus and method for receiving and decoding a multiplexed data stream organized in sectors containing payload portions individually destined for one of two or more decoders. The apparatus is connected to a memory device addressable in an address space. At least one of the decoders generates read and/or write addresses from within a predetermined address range that is a true subset of the address space. For avoiding additional memory accesses caused by moving data already contained in the memory into the decoder address range, the apparatus has an address translator which translates the decoder addresses into translated addresses and uses the translated addresses for accessing the memory device.

9 Claims, 8 Drawing Sheets

METHOD AND APPARATUS FOR MANAGING MEMORY ACCESSES IN AN AV DECODER

This application claims the benefit, under 35 U.S.C. 119, of European Patent application no. 05106000.2 filed 1 Jul. 2005.

FIELD OF THE INVENTION

The invention relates to a method and an apparatus for managing memory accesses for an AV decoder, in particular for managing the demultiplexing and data handling involved in decoding and playing back multi-component AV bitstreams.

BACKGROUND OF THE INVENTION

AV data are binary data read out from storage media like CD-ROM, VCD, S-VCD, DVD or BD or received through a transmission channel, which contain segments destined for a set of one or more component decoders, like Audio, Video, or Sub-picture. In an AV playback device, data are arriving from the source (storage media or transmission channel) at a first data rate which may be time-varying, near-constant or constant-in-sections; they are typically fed to a buffer memory in order to compensate for the different instantaneous or short-term data rates of the data source and the data destination (the component decoders).

In case of optical media readout, the buffer memory is sometimes called track buffer or mechanical buffer; here it also serves to bridge those time intervals when the incoming data stream is interrupted. Such interruption happens whenever the optical pickup is being sent to a different location on the media to jump to a different target address. It also happens, in the form of being sent back a few tracks, as part of buffer control in cases of low data consumption, e.g. when decoding low-activity passages of video and/or audio signal.

Conventionally, data are organised in sectors of often constant length, and sectors contain pieces of payload. Very commonly, the payload of each sector is implicitly guaranteed to be destined to one component decoder only.

In many known AV decoders, data segments are re-copied from the track buffer into individual decoder bit buffers associated with the component decoders. Conceptually, the task of delivering each data segment to the component detector it is destined for is a demultiplexing task. In state of the art devices, sectors are read into memory and then the decoder payload of the sectors is copied to the appropriate decoder bit buffers. From each of the decoder bit buffers, the associated decoder receives its input, and will often copy the data in turn to an internal working memory used during the decoding proper.

EP 0917147 A describes a method and apparatus for improved controlling of a track buffer, where an input data stream is written to a data buffer and is controlled in such a way that at least one output data stream derived from the input data stream is forwarded to an associated data decoder by means of a chained list generated by a software demultiplexer. The track buffer TB and the decoder bit buffers are mapped into the same physical memory, and the component decoders directly process the data that were initially written to the track buffer, using a chained list technique. In this way re-copying data from the track buffer TB into the decoder bit buffers can be avoided.

The known method and apparatus can be seen to have the disadvantage that although they avoid copy operations from track buffer to decoder bit buffers, still a copy operation has to be performed when data are accepted from a decoder bit buffer into a decoder internal working memory which prior art component decoders require. Decoder internal working memory is necessary because efficient compression algorithms employ reference data that are derived from previously processed data, like pieces of previously decoded signal or of a predicted signal derived therefrom. Such reference data are typically held in the decoder internal memory, and prior art component decoders expect this memory at addresses which either are fixed or can only be changed occasionally as part of a decoder setup procedure.

First reading data into memory and later on copying the same data into dedicated decoder memory areas summarises into a big required memory access bandwidth and hence instrument hardware cost. A problem to be solved by the invention hence is to improve the memory management to that respect.

SUMMARY OF THE INVENTION

The invention achieves this by making it possible to avoid altogether any data copying or data moving inside the memory, after data have once been written into it.

An apparatus according to the invention is connected to a memory device that covers or is addressable in an address space. The apparatus has two or more decoders and receives and decodes a data stream organised in sectors which contain payload portions individually destined for one of the decoders. At least one of the decoders generates decoder read and/or write addresses from within a predetermined subset of the address space, and in that way requests data to be written to or read from memory. According to the invention, the apparatus writes each sector of the data stream into the memory device at most once, it has an address translator which translates the decoder addresses into translated addresses which are not confined to be from within the predetermined subset. The apparatus uses the translated addresses for accessing the memory device. The advantage is that in exchange for a moderate additional hardware, namely the address translator, repeated writing and re-writing of identical data is avoided, hence memory bandwidth requirement is drastically reduced.

Advantageously, the address translator of the apparatus receives, for sectors as they are being received one after the other, a particular destination information describing the destination of the payload portions of the sectors and particular memory addresses under which the received sectors have been stored in the memory; it further receives a second kind of memory addresses, namely addresses of those data that selected ones of the decoders request to access; it translates the memory addresses of the second kind into a third kind of memory addresses using the destination informations and the first memory addresses of the sectors received so far; and it provides this third kind of memory addresses so that the requesting decoder can access the requested data in the memory. It is of advantage that the described mechanism is actually not limited to decoders requesting to read data from memory; it can also be used to realise requests where decoders want to write or modify the memory data at certain locations. Such modifications occur, for example, during video dcoding, when a reconstructed picture is being calculated as the additive superposition of a predicted picture and a decoded prediction error.

Advantageously, the address translator of the apparatus comprises a set of address translation units, each associated to one of the decoders. Each address translation unit receives, as memory addresses of a first kind, addresses of those received sectors that are destined for the decoder associated to the address translation unit, and it receives, as memory addresses of a second kind, addresses that the associated decoder requests to access. With these data, the address translation unit translates the memory addresses of the second kind into memory addresses of a third kind, namely addresses under which the associated decoder can really access the data it requests. This structure has the advantage of being regular, hence it can easily be designed and scaled to different decoder configurations.

Advantageously, also, each of the described address translation units comprises a set of address translation stages each having an input and an output respectively connected in parallel. Each of the address translation stages, in turn, comprises local memory means for an address range and for an address offset, an address comparator which checks whether or not an input address present at the input is within the address range, an adder to add the address offset to the input address, and a gate that passes the addition result to the output of the address translation stage if the check is true. This structure has the advantage that it consists of mostly simple gate logic that is apt to be implemented in a way not causing additional clock delays.

Memory accesses are managed in such an apparatus, according to the invention, in that the data of received sectors are stored into memory under a first memory address; the first memory address and the destination information of the received sector is provided to address translation means; when one of the decoders requests data from a second memory address, the second memory address is forwarded to the address translation means; in the address translating means, the second memory address is translated into a third memory address; the requested data is retrieved from the memory using the third memory address and is transferred to the decoder. This method advantageously allows to continue using conventional decoder designs which expect their working memory at a fixed subset of the overall address space, while the true memory accesses take place in an arbitrary, scattered subset of the overall address space, flexibly adapting itself to any order or arrangement in which incoming sectors may have been written to memory.

Advantageously, when the address translation means comprises a set of address translation units each associated to one of the decoders, in the step of providing, the first memory address is provided to the address translation unit associated with the decoder of the received sector; in the step of forwarding, the second memory address is forwarded to the address translation unit associated with the decoder which requested the data, and the step of translating is performed in the address translation unit associated with the decoder which requested the data. This has the advantage of breaking up the overall computations into a set of basic and simple data manipulations.

Also, it is of advantage, if for translating, the second memory address is compared to a set of address ranges, and the third memory address is calculated from the second memory address using an address offset associated with that address range in which the second memory address is.

In this case, when one of the decoders requests data from a linear sequence of second memory addresses starting with a start memory address and ending with an end memory address, the step of translating advantageously comprises substeps of comparing the start memory address to the set of address ranges; of calculating a translated start memory address from the start memory address using the address offset associated with that address range in which the start memory address is; of calculating, if the end memory address also is in the address range, a translated end memory address from the end memory address using the address offset, and retrieving the requested data from the memory means using the translated start memory address and the translated end memory address; and of retrieving, if the end memory address is outside the address range, a part of the requested data from the memory means using the translated start memory address and the address range and repeating the substeps with a modified start memory address.

With other words, in the present invention a dedicated memory management is proposed, which while avoiding data copying within RAM altogether, nevertheless provides to the decoders a linear address space to work upon. Realisations of the proposed memory management are described, which constitute small separate pieces of address conversion logic, which easily fit in between conventional approaches for data read-in and for decoder IC cores.

BRIEF DESCRIPTION OF DRAWINGS

Exemplary embodiments of the invention are illustrated in the drawings and are explained in more detail in the following description. The explanations use an example where the data destinations are individual component decoders of an AV decoder or player. However, it is obvious to the expert in the field, that the principles of the invention can also be used in systems where the data destinations are any other data consuming or data accessing units or sub-units. In this sense, the term "decoders" in the following shall be understood to encompass "data sink", "data destination" or "data accessor" in general.

In the figures.

DETAILED DESCRIPTION

Figure 1:
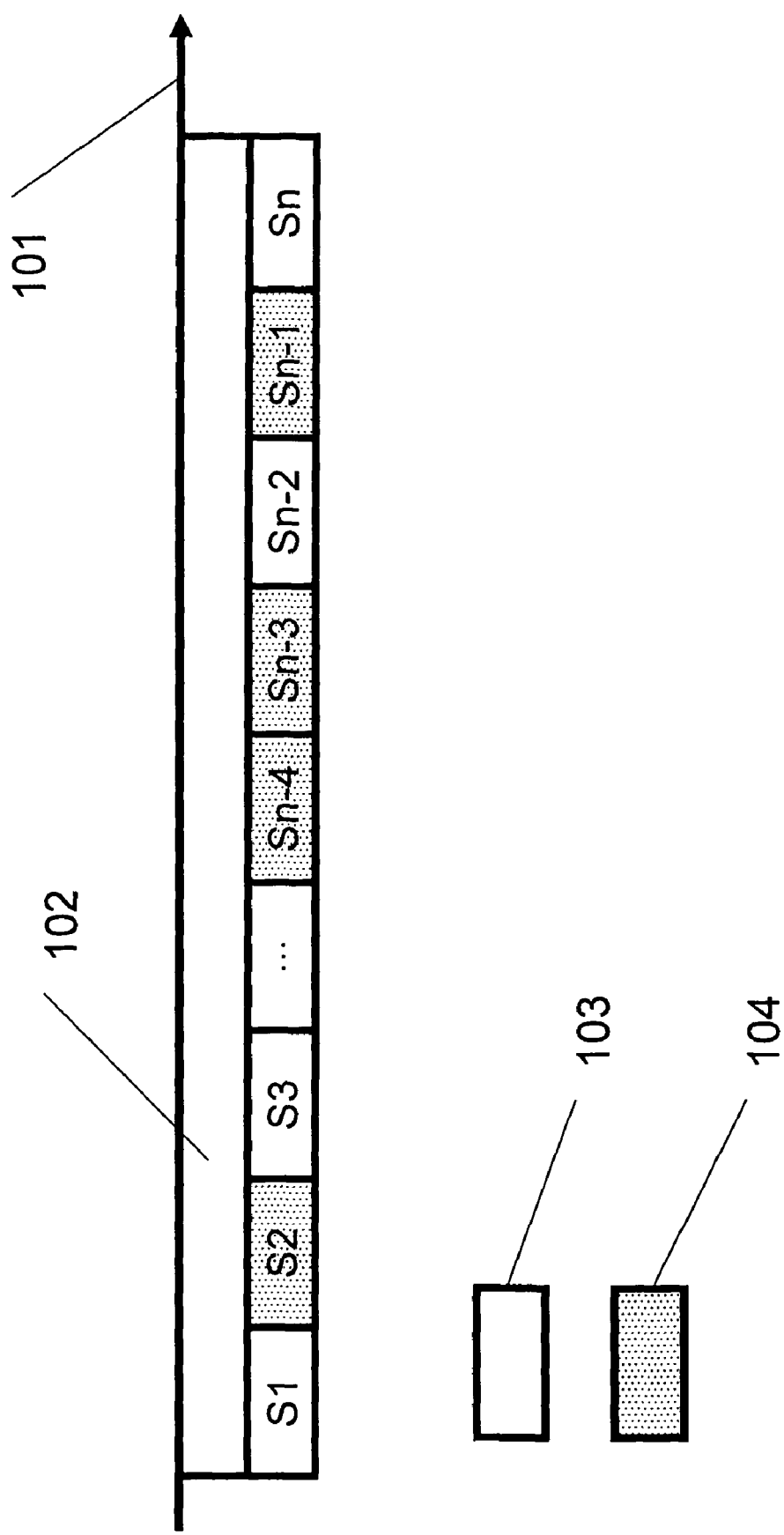
FIG. 1 shows an example of an arrangement of sectors in a buffer.

FIG. 1 shows an example of an arrangement of sectors S1-Sn within a sector buffer 102 covering a subset of an address domain 101. The sectors S1-Sn are indicated as being either free sectors 103 or used sectors 104. As shown in the example of FIG. 1, the used sectors may be arbitrarily distributed within the sector buffer. The address domain 101 in this case is a file manager address domain.

Figure 2:
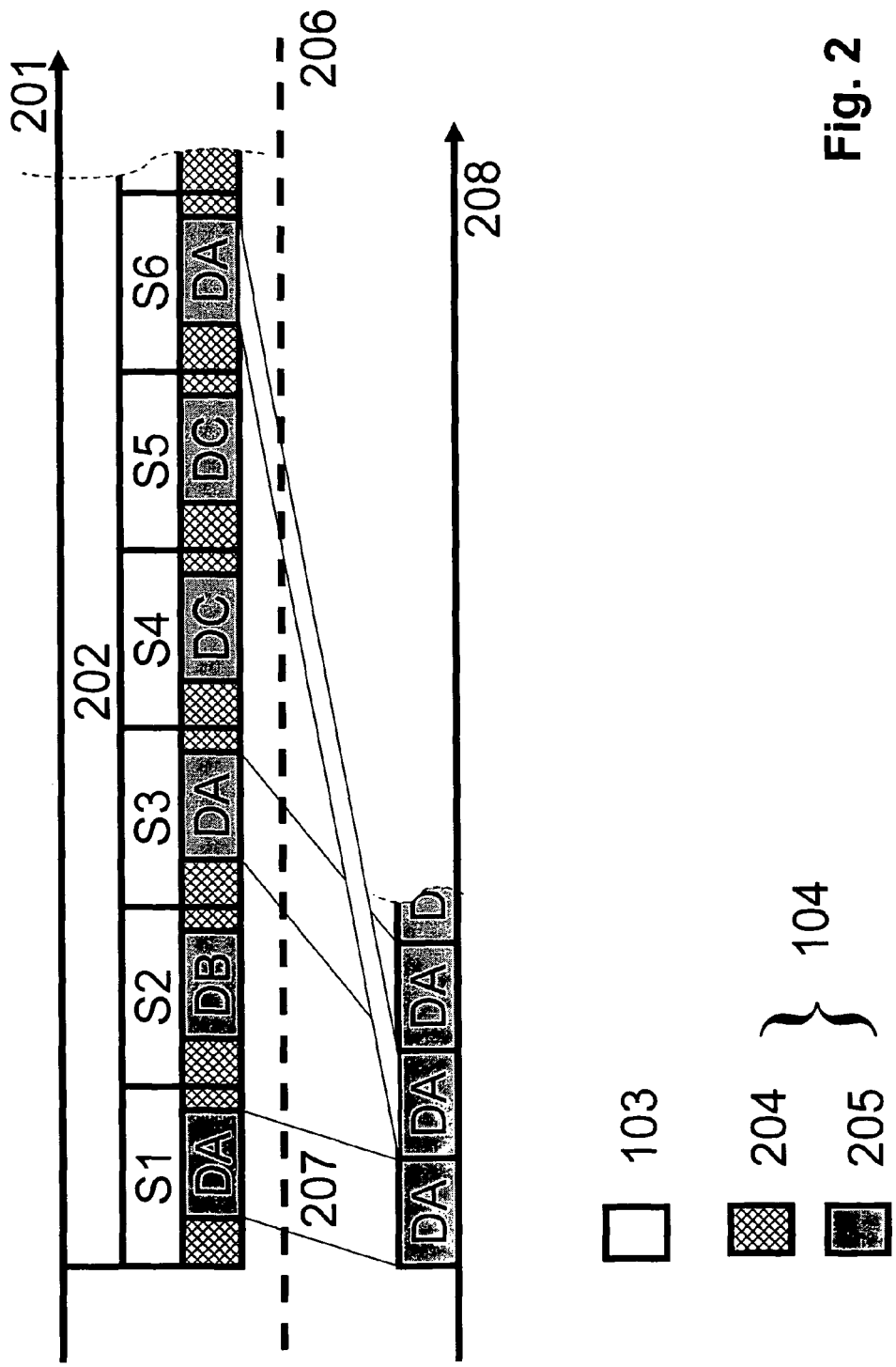
FIG. 2 shows a first example of a data arrangement.
Figure 3:
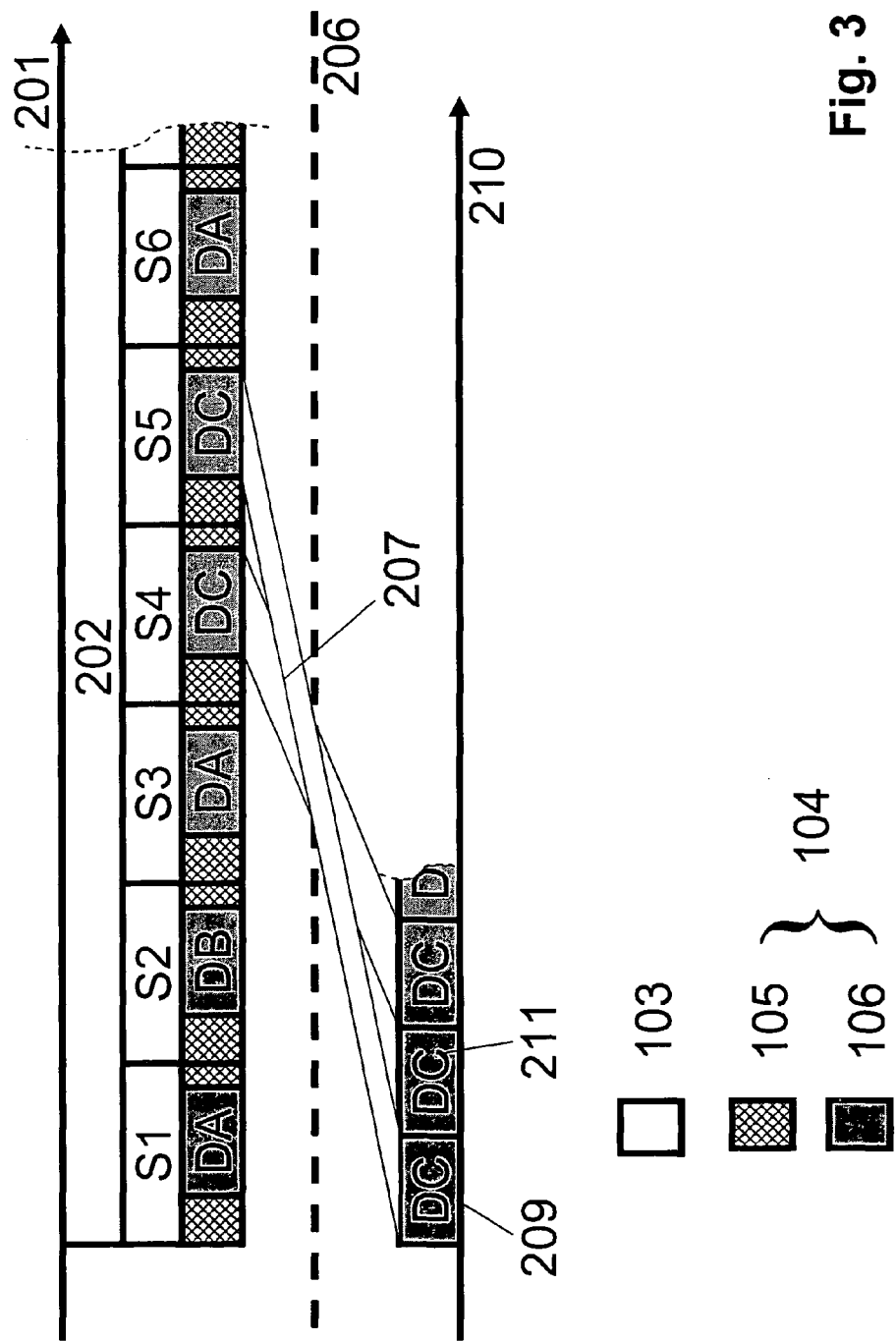
FIG. 3 shows a second example of a data arrangement.

FIGS. 2 and 3 show examples of data arrangements, where for compactness of illustration it is assumed that the part of the sector buffer shown contains all used sectors 104, i.e. has no free sectors 103. The Figures aim to illustrate that, generally, even within the used sectors 104, only part 106, 205, 209 of the sectors S1-S6 constitutes decoder payload. The remaining sector content 204, which typically is control information but may comprise other data as well, is not destined for the decoder. Given this arrangement of relevant and irrelevant data, a memory management unit or MMU must provide access only to the decoder payload part of the sectors. Hence the MMU can be seen to provide the data of a decoder address domain 208 to the decoders, and FIGS. 2 and 3 in comparison illustrate how, from one file manager address domain 201, data of two different decoder address domains 208, 210 can alternatively be derived. The transition from the file manager address domain 201 to the decoder address domains 208, 210 can be visualised as crossing a logical address domain boundary 206.

It must be noted that the sequence of sectors S1-S6 shown in FIGS. 2 and 3 does conceptually not correspond to a data stream or part thereof. In state of the art writing an incoming data stream to the data buffer, sectors are used and re-used in random order, just as they are being signalled as being free or free again to receive data. Of course, after reset or switch on, the entire data buffer is free. In this case, it may happen more or less by chance that temporally consecutive incoming sectors get stored in physically consecutive memory locations. Whereas the data stream designates a sequence of sectors in readout or reception order, the sequence of syectors shown in FIGS. 2 and 3 shows them in address order, i.e. the Figs symbolically show the memory content.

In FIG. 2, the upper part shows a file manager address domain 201 in which a sector buffer 202 consisting of sectors S1-S6 is located. The sectors S1-S6 are shown to contain overhead data 204 as well as decoder payload data 205 destined for decoders DA, DB and DC. Although not shown, the location and size of the payload data 205 within the sectors S1-S6 may in general vary from sector to sector. The middle and bottom part of FIG. 2 then symbolically show an address domain boundary 206 across which the decoder payload 205 destined for decoder DA is being re-purposed 207 into a decoder DA address domain 208. The example additionally illustrates that not only the absolute position, but even the order of sector payload in the decoder address domain 208 may partly be different from the order of the enclosing sectors S1-S6 within the file manager address domain 201. Of course, such an irregular or inverted payload ordering must somehow be indicated. It may be indicated explicitly by information within the decoder payload or within the overhead data; or be implicitly derivable from rules governing the data stream or the way it is stored into memory.

FIG. 3 is based on the same sequence of sectors S1-S6 to start with, and then shows re-purposing 207 of decoder DC payload 209 into a decoder DC address domain 210. Again, the order of payload is inverted between the two address domains 201, 210. In the decoder address domain 210, there even is one piece of decoder DC payload 211 that still needs to be retrieved from or associated to a sector payload in the file manager address domain. It is up to the application format in question to define maximum delay times allowable until such belated payload must be available.

Figure 4:
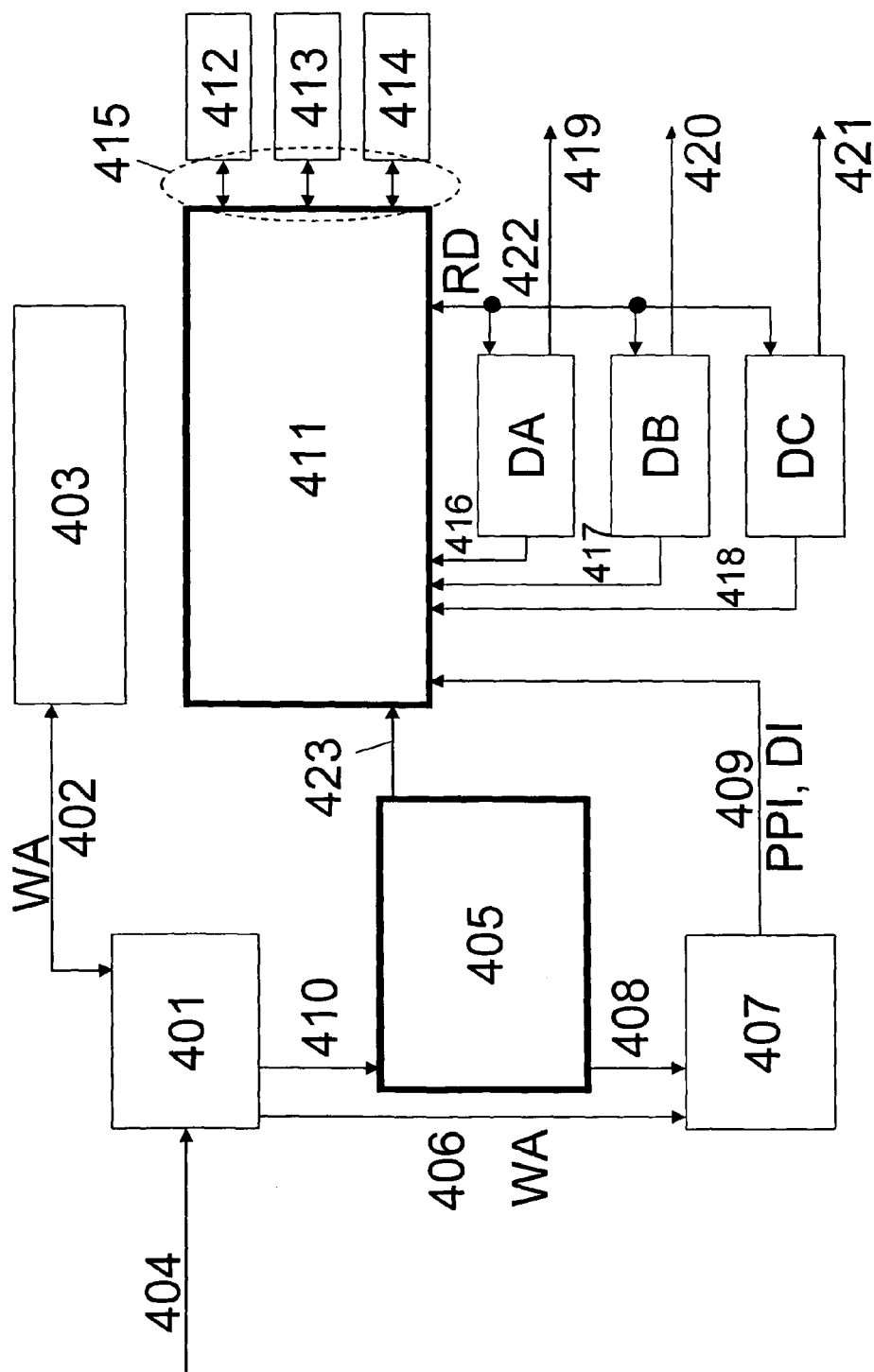
FIG. 4 shows a block diagram of a first implementation of the invention.

FIG. 4 shows a first implementation of the invention, which has a file manager 401 connected 402 to a sector buffer space map 403. The file manager 401 has an input to receive a sector stream 404, and it has a data output 410 connected to a sector buffer 405 and a control output 406 connected to a demultiplexer 407. The demultiplexer 407 has a read access 408 to the sector buffer 405 and a control output 409 connected to a memory controller 411. The memory controller 411 has a data access 423 to the sector buffer 405, and an output 422 that is connected to inputs of two or more decoders DA, DB, DC, for each of which the memory controller 411 maintains 415 a payload map 412, 413, 414. Each of the decoders DA, DB, DC has a control output 416, 417, 418 for requesting data accesses; the control outputs 416, 417, 418 are connected to the memory controller 411. Each of the decoders has another output 419, 420, 421 for the decoded data.

Whenever the file manager 401 receives an incoming sector of the sector stream 404, it retrieves 402 from the sector buffer space map 403 an address WA indicating a free space or a no longer used space in the sector buffer 405 that is ready to receive new data. The file manager 401 then writes 410 the sector into the sector buffer 405 at addresses starting from the address WA, marks the address WA in the sector buffer space map 403 as no longer free, and indicates 406 to the demultiplexer 407 the availability of a new sector as well as the address WA used for storing it. The demultiplexer 407, using the address WA, inspects the new sector in the sector buffer 405, and extracts or otherwise generates a payload position information PPI and a destination information DI both of which it forwards 409 to the memory controller 411. The memory controller 411, using the destination information DI, forwards 415 the payload position information PPI to that one among the payload maps 412, 413, 414 that is associated with the destination of the payload.

From then on, whenever a decoder DA, DB, DC sends 416, 417, 418 a data request to the memory controller 411, the memory controller 411, using the payload map 412, 413, 414 associated to the requesting decoder DA, DB, DC, delivers 422 requested data RD to the requesting decoder DA, DB, DC or allows the requesting decoder DA, DB, DC a write access to the requested data RD.

It has been described above, how incoming sectors are written into the sector buffer at a free sector address WA which thereupon is marked as no longer free. Correspondingly, as soon as a sector is known to be no longer needed by any of the decoders, its address WA is marked in the sector buffer space map 403 as free. This fast and simple operation is enough to guarantee that the memory at address WA will sooner or later be used again, i.e. overwritten, to receive a new incoming sector.

In the context of AV data decoding, depending on the data being presented, on user's choice and on apparatus settings, payload data destined for certain ones of the decoders DA, DB, DC may be known beforehand to be not needed during an ongoing playback. The most typical example of this are the unselected audio channels in a multi audio context. If that is the case, it will typically be the demultiplexer 407 which will recognise the pertaining sectors and exclude them from any further processing. Alternatively, in order to avoid the sector buffer being filled with garbage as much and as early as possible, one may as well implement this capability into the file manager 401, which in that case needs an at least basic demultiplexing capability of its own. Therefore any processing steps given in this description are to be understood to involve many, but not necessarily all sectors or parts of payload within a data stream.

Figure 5:
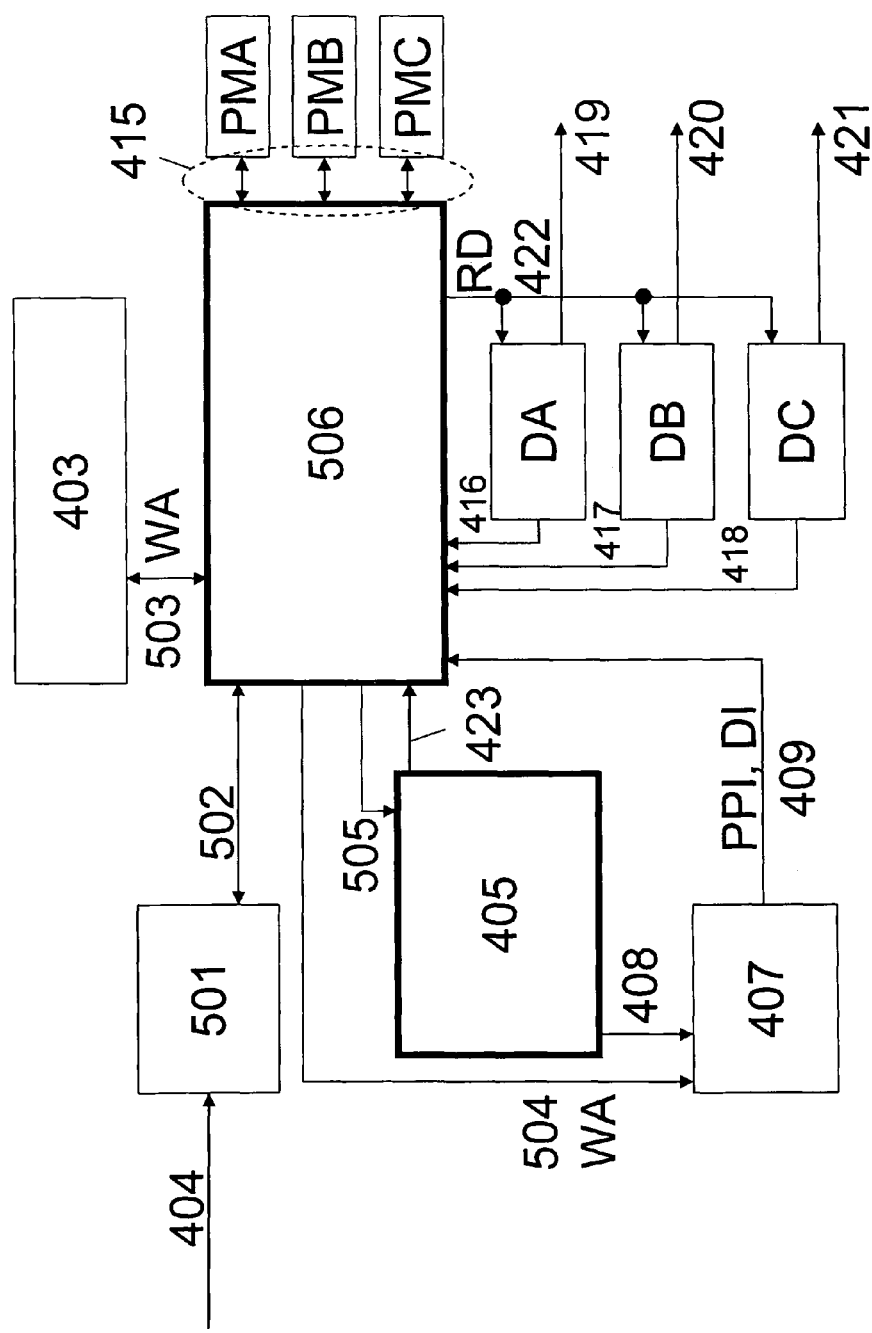
FIG. 5 shows a block diagram of a second implementation of the invention.

FIG. 5 shows a second implementation of the invention, with identical numerals indicating elements identical to those of FIG. 4. In this case, it is not the file manager 501 which handles the storing and freeing of new sectors in the sector buffer. Rather, an extended memory controller here called memory management unit or MMU 506 performs this task. This approach reduces the processing power requirements for the file manager 501, at the expense of the MMU 506 being more complex than the memory controller 411.

The implementation has a file manager 501 which is connected 502 to a memory management unit 506 and has an input to receive a sector stream 404. The memory management unit 506 is connected 503 to the sector buffer space map 403, it has a data output 505 connected to the sector buffer 405 and it has a control output 504 connected to the demultiplexer 407. The control output 409 of the demultiplexer 407 is connected to the memory management unit 506.

In this case, whenever the file manager 501 receives an incoming sector of the sector stream 404, it forwards 502 it to the memory management unit 506. The memory management unit 506 then retrieves 503 from the sector buffer space map 403 the address WA, writes 505 the sector into the sector buffer 405 at address WA, and indicates 504 to the demultiplexer 407 the availability of a new sector as well as the address WA used for storing it. The demultiplexer 407 forwards 409 the payload position information PPI and the destination information DI to the memory management unit 506. The memory management unit 506, using the destination information DI, forwards 415 the payload position information PPI to that one among the payload maps 412, 413, 414 that is associated to the destination of the payload. The remaining elements or processing steps are identical to those described for FIG. 4.

Figure 6:
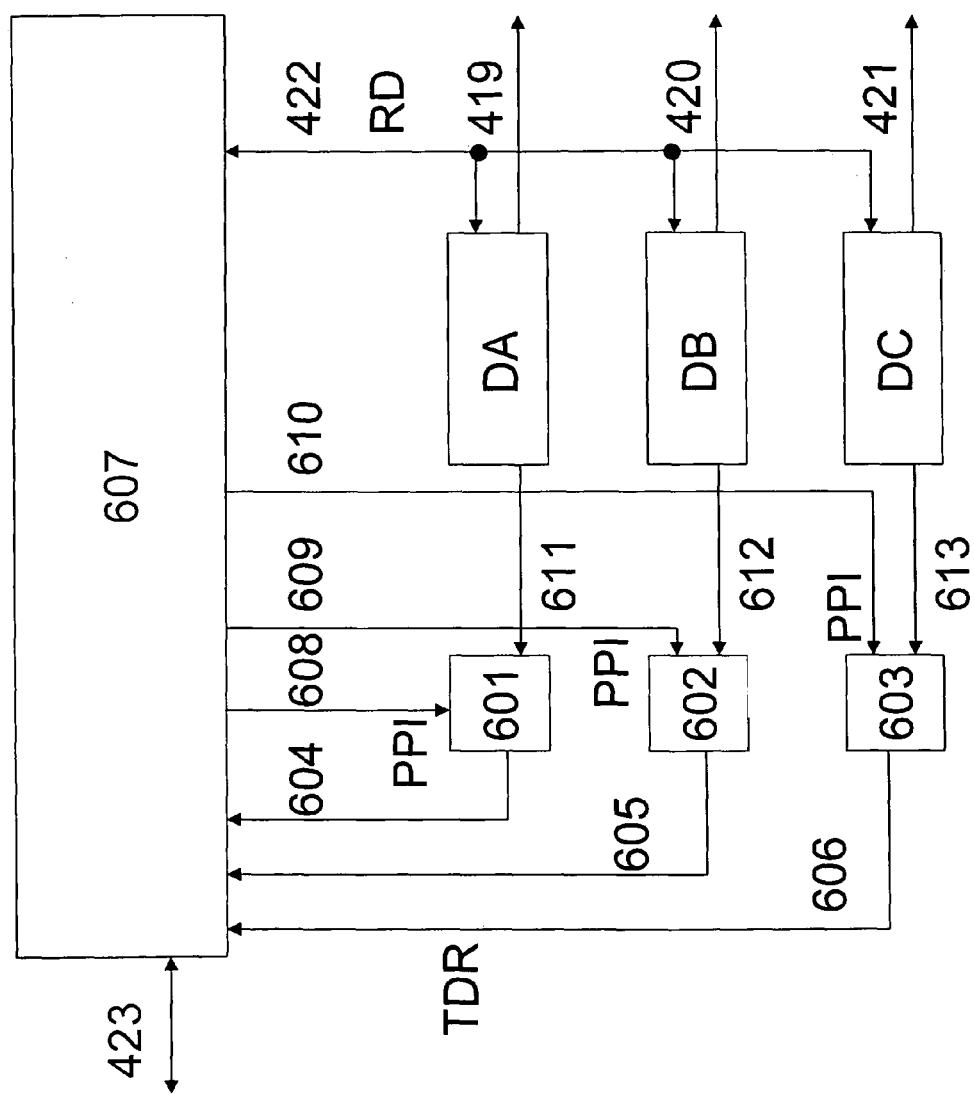
FIG. 6 shows in block diagram form parts of a third implementation of the invention, with a memory controller and address translation units.

FIG. 6 shows parts of a third implementation of the invention, containing address translation units 601, 602, 603 that are an alternative to the payload maps 412, 413, 414 of FIGS. 4 and 5. Here, a memory controller 607 has data access 423 to a sector buffer (not shown) and has an output 422 that is connected to inputs of two or more decoders DA, DB, DC, as before. As before, each of the decoders DA, DB, DC has a control output 611, 612, 613 for requesting data accesses; but here these control outputs are individually connected to the address translation units 601, 602, 603 associated to the decoders DA, DB, DC. Each of the address translation units 601, 602, 603 has a control input 608, 609, 610 for receiving payload position information PPI from the memory controller 607. It also has a control output 604, 605, 606 for sending translated data requests TDR to the memory controller 607.

Whenever an incoming sector has been received and written into the sector buffer, the memory controller 607, using a destination information DI, forwards 608, 609, 610 the payload position information PPI to that one among the address translation units 601, 602, 603 that is associated with the destination of the payload. Of course, alternatively to each of the address translation units 601, 602, 603 being individually connected to the memory controller 607, a bus-like connection can also be used. In that case, the memory controller 607 must put onto the bus not only the payload position information PPI, but also the destination information DI or an equivalent identifier of some kind, allowing the relevant address translation unit 601, 602, 603 to react and to retrieve the PPI from the bus. The decoders DA, DB, DC send 611, 612, 613 all data requests to their associated address translation units 601, 602, 603, which translate the requested data address and send the resulting translated data requests TDR to the memory controller 607. The memory controller 607, using the translated data requests TDR, read accesses 423 the sector buffer (not shown) and delivers 422 requested data RD to the requesting decoder DA, DB, DC. Correspondingly, for servicing a write access request, the memory controller 607 receives 422 requested data RD from the requesting decoder DA, DB, DC, and, using the translated data requests TDR, stores 423 the data to the sector buffer (not shown).

Figure 7:
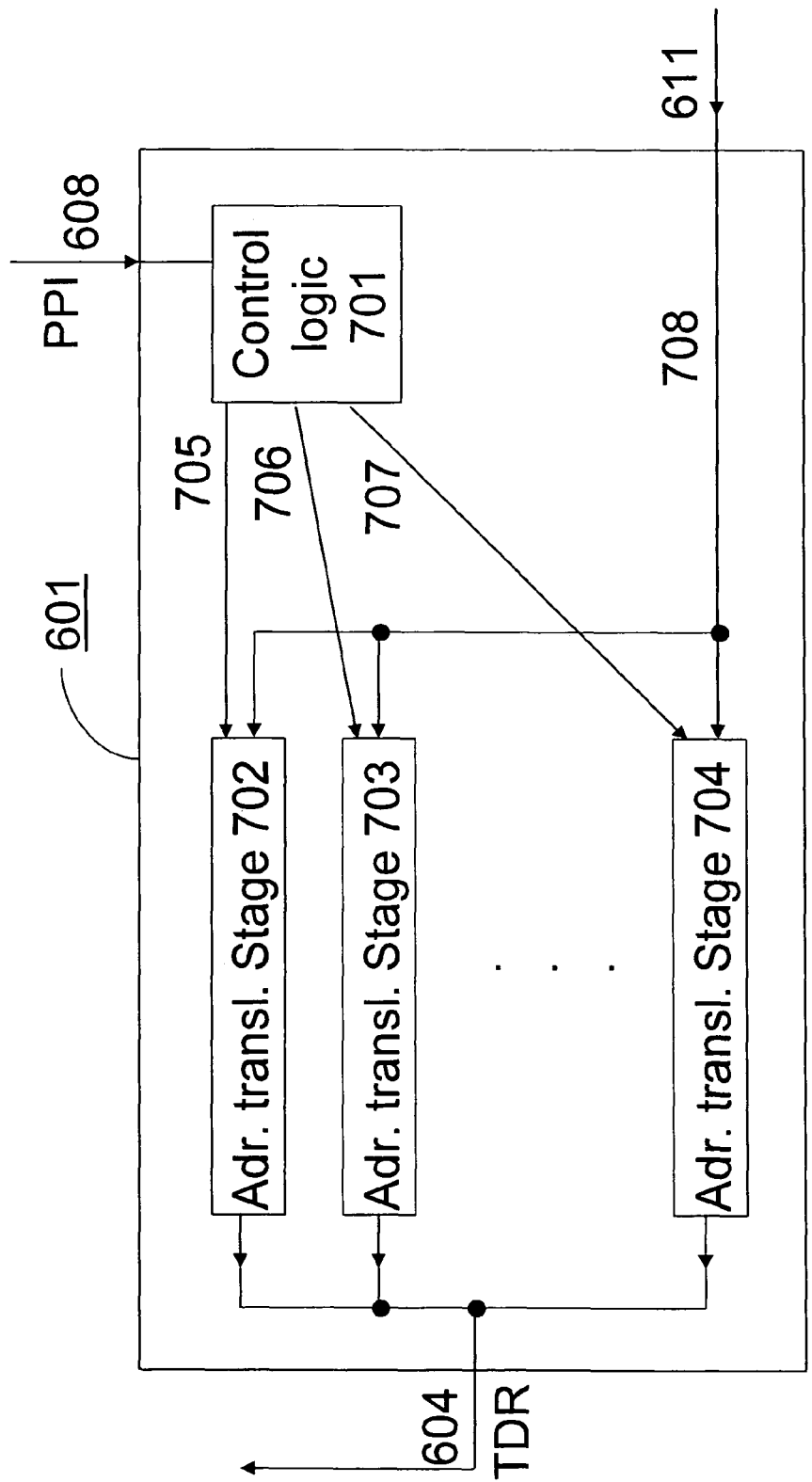
FIG. 7 shows in block diagram form the internal structure of an address translation unit of the invention.

FIG. 7 shows in block diagram form the internal structure of the address translation unit 601 assumed to be associated to decoder DA; the same structure applies for all address translation units and their respectively associated decoders. The address translation unit 601 has a set of one or more address translation stages 702, 703, 704, and a control logic 701. Each of the address translation stages 702, 703, 704 can locally store a payload position information PPI, which it uses to realise one linear subset of the address mapping required for the payload of decoder DA. Depending on the fragmentation of the data on which the decoder DA currently works, the address mapping valid at any time for decoder DA consists of a varying number of such linear subsets, and hence a varying number of address translation stages are needed to implement these. Therefore, an appropriate number of address translation stages must be instantiated, each of which, at any instance, can be in an active or inactive state. The number of stages depends among others on global system parameters like sector size or maximum allowed memory size.

When an incoming sector destined for decoder DA has been received, the control logic 701 receives the pertaining payload position information PPI through its input 608, forwards 705, 706, 707 it to one of the inactive address translation stages 702, 703, 704, to locally store the payload position information, and sets that address translation stage into the active state.

Data requests received 611 from decoder DA, are internally forwarded 708 in parallel to all address translation stages 702, 703, 704. Depending on in which of the linear subsets the requested data address falls, one of the active ones of the address translation stages 702, 703, 704 will then translate the requested data address and will output 604 the resulting translated data request TDR.

Figure 8:
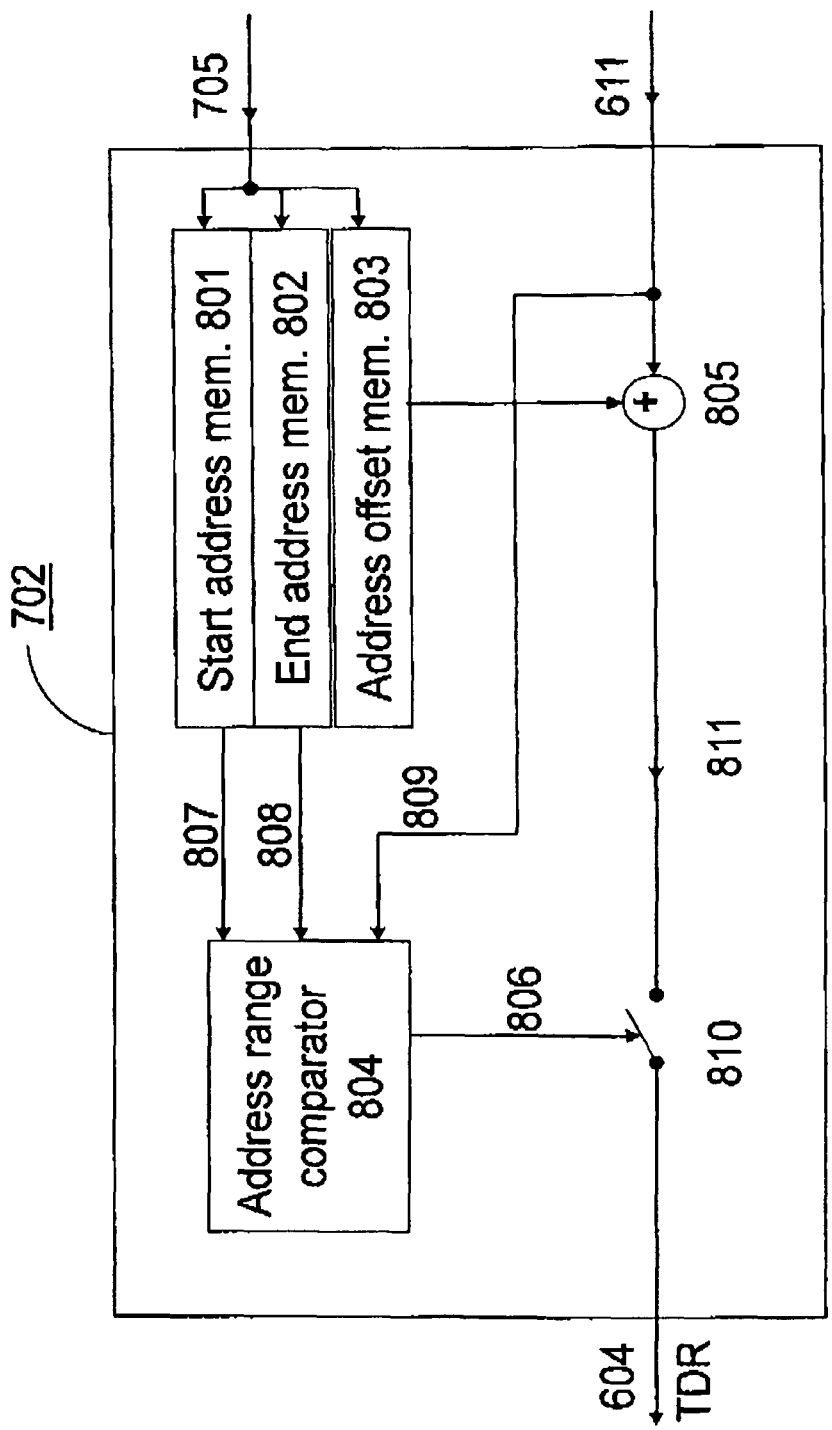
FIG. 8 shows in block diagram form the internal structure of an address translation stage of the invention.

FIG. 8 shows in block diagram form the internal structure of the address translation stage 702; the same structure applies for all address translation stages. The input connection 705 of the address translation stage 702, through which payload position information PPI is received, is connected to a start address memory 801, an end address memory 802, and an address offset memory 803. Whenever a payload position information PPI is received, a start address, an end address, and an address offset are derived therefrom and written into these memories, respectively. The contents of the start address memory 801 and of the end address memory 802 are forwarded 807, 808 to an address range comparator 804, whereas the content of the address offset memory 803 is forwarded to an adder 805. Through a data request input 611, addresses of those data are received, that the associated decoder requests access to. Requested addresses are forwarded 809 to the address range comparator 804, where it is checked whether the requested address is or is not within the address range defined by the start address and the end address. The result of the check is used 806 to control a gate 810. In parallel to being forwarded to the address range comparator 804, each requested address is also forwarded to the adder 805, where the content of the address offset memory 803 is added to it. If the check of the address range comparator 804 is positive, the result of the addition is connected, via the gate 810, to the control output 604 of the address translation stage 702 where it constitutes a translated data request TDR.

With other words, the invention describes apparatus and method for receiving and decoding a multiplexed data stream 404 organised in sectors S1-S6, Sn containing payload portions 205 individually destined for one of two or more decoders DA, DB, DC. The apparatus is connected to a memory device 405 addressable in an address space 101, 201. At least one of the decoders DA, DB, DC generates read and/or write addresses 416-418, 611-613 from within a predetermined address range that is a true subset of the address space 101, 201. For avoiding additional meory accesses caused by moving data already contained in the memory 405 into the decoder address range, the apparatus has an address translator 411, 506, 601, 602, 603 which translates the decoder addresses 416-418, 611-613 into translated addresses TDR, 604, 605, 606 and uses the translated addresses for accessing 423 the memory device 405.

The invention claimed is:

1. A method for receiving and decoding a multiplexed data stream, the method comprising the steps of:
   receiving a data stream organized as a sequence of sectors, each sector containing data destined to one of a plurality of decoders, each sector associated with a destination information indicating an associated decoder;
   storing the data of a received sector into a memory device retrievable under a first memory address;
   providing the first memory address and the destination information of the received sector to an address translation device;
   receiving, from a selected one of the decoders, a second memory address and a request to read data beginning at the second memory address;
   forwarding, the second memory address to the address translation device;
   deriving, in the address translation device, a third memory address from the second memory address and from the destination information;
   retrieving the requested data from the memory device using the third memory address and transferring the data to the selected one of the decoders.

2. The method of claim 1,
   wherein the address translation device comprises a plurality of address translation units, each address translation unit associated with one of the decoders;
   wherein, in the step of providing, the first memory address is provided to the address translation unit associated with the decoder of the received sector;
   wherein, in the step of forwarding, the second memory address is forwarded to the address translation unit associated with the decoder which requested the data; and
   wherein the step of deriving is performed in the address translation unit associated with the decoder which requested the data.

3. The method of claim 2, wherein the step of deriving comprises the steps of:
   comparing the second memory address to a set of address ranges, each address range associated with an address offset; and
   calculating the third memory address from the second memory address using that address offset which is associated with the address range in which the second memory address is.

4. The method of claim 3, wherein one of the decoders requests data from a linear sequence of second memory addresses starting with a start memory address and ending with an end memory address;
   wherein the step of deriving comprises the steps of
   comparing the start memory address to the set of address ranges;
   calculating a translated start memory address from the start memory address using the address offset associated with that address range in which the start memory address is;
   calculating, if the end memory address also is in the address range, a translated end memory address from the end memory address using the address offset, and retrieving the requested data from the memory device using the translated start memory address and the translated end memory address; and
   retrieving, if the end memory address is outside the address range, a part of the requested data from the memory device using the translated start memory address and the address range and repeating the translating steps with a modified start memory address.

5. The method of claim 1, wherein the step of deriving comprises the steps of:
   comparing the second memory address to a set of address ranges, each address range associated with an address offset; and
   calculating the third memory address from the second memory address using that address offset which is associated with the address range in which the second memory address is.

6. The method of claim 5, wherein one of the decoders requests data from a linear sequence of second memory addresses starting with a start memory address and ending with an end memory address;
   wherein the step of deriving further comprises the steps of:
   comparing the start memory address to the set of address ranges;
   calculating a translated start memory address from the start memory address using the address offset associated with that address range in which the start memory address is;
   calculating, if the end memory address also is in the address range, a translated end memory address from the end memory address using the address offset, and retrieving the requested data from the memory device using the translated start memory address and the translated end memory address; and
   retrieving, if the end memory address is outside the address range, a part of the requested data from the memory device using the translated start memory address and the address range and repeating the deriving steps with a modified start memory address.

7. An apparatus for receiving and decoding data in a multiplexed data stream, comprising:
   a memory device, associated with an address space having a plurality of addresses;
   a plurality of decoders, wherein a select decoder has a capability to read and write and to generate a decoder address from within a predetermined subset of the address space;
   wherein the multiplexed data stream is organized into sectors, each sector containing one or more payload portions, each payload portion individually destined to a select one of the decoders, each payload portion having associated destination information;
   a controller, coupled to the memory device, and equipped to write each sector of the multiplexed data stream into the memory device at most once; and
   an address translator equipped to derive an address for accessing a sector in the memory device from the decoder address and from the destination information;
   wherein the address translator is configured to:
      receive, for each sector, the destination information and a first memory address indicating where the sector is stored in the memory device,
      receive, from a selected one of the decoders, a second memory address and a request to read data beginning at the second memory address,
      translate the second memory address into a third memory address using the destination information and the first memory address, and
      provide the third memory address to the controller for retrieving the requested data from the memory device; and wherein the controller is equipped to retrieve the requested data from the memory device using the third memory address, and to transfer the data to the selected one of the decoders.

8. The apparatus of claim 7, wherein the address translator comprises:
    a plurality of address translation units, each address translation unit associated with a select one of the decoders, each address translation unit is configured to:
        receive the first memory address of those received sectors that are destined for the associated decoder,
        receive the second memory address of those data that are requested by the associated decoder, and
        translate the second memory address into the third memory address for those data that are requested by the associated decoder.

9. The apparatus of claim 8, wherein each address translation unit further comprises:
    a plurality of address translation stages, each address translation stage having an input and an output, wherein each input and each output is connected in parallel, each address translation stage comprising:
        a local memory device associated with an address range and an address offset;
        an address comparator which checks whether or not an input address present at the input is within the address range;
        an adder to add the address offset to the input address; and
        a gate that passes an output of the adder to the output of the address translation stage if the check is true.

* * * * *